United States Patent
McNeeney et al.

(10) Patent No.: US 9,690,662 B2
(45) Date of Patent: Jun. 27, 2017

(54) TECHNIQUES FOR VIRTUAL MACHINE MANAGEMENT

(75) Inventors: Adam James McNeeney, Cambridge (GB); James Mulcajy, Manchester (GB)

(73) Assignee: International Business Machines Corporation, Armonk, NY (US)

( * ) Notice: Subject to any disclaimer, the term of this patent is extended or adjusted under 35 U.S.C. 154(b) by 832 days.

(21) Appl. No.: 13/996,037

(22) PCT Filed: Dec. 19, 2011
(Under 37 CFR 1.47)

(86) PCT No.: PCT/EP2011/073262
§ 371 (c)(1),
(2), (4) Date: Jun. 20, 2013

(87) PCT Pub. No.: WO2012/084839
PCT Pub. Date: Jun. 28, 2012

(65) Prior Publication Data
US 2013/0275808 A1     Oct. 17, 2013

(30) Foreign Application Priority Data
Dec. 21, 2010   (EP) ..................... 10196296

(51) Int. Cl.
*G06F 11/14*    (2006.01)
*G06F 11/20*    (2006.01)
(Continued)

(52) U.S. Cl.
CPC ...... *G06F 11/1407* (2013.01); *G06F 9/45558* (2013.01); *G06F 11/1482* (2013.01);
(Continued)

(58) Field of Classification Search
CPC ............. G06F 11/1438; G06F 11/1482; G06F 11/2023; G06F 11/203; G06F 11/2094;
(Continued)

(56) References Cited

U.S. PATENT DOCUMENTS 6,625,751 B1 *   9/2003   Starovic et al. ................ 714/11
8,499,297 B2 *   7/2013   Chen et al. ....................... 718/1
(Continued)

OTHER PUBLICATIONS

Minjia Zhang et al., VirtCFT: A Transparent VM-Level Fault-Tolerant System for Virtual Clusters, Parallel and Distributed Systems (ICPADS), 2010 IEEE 16th International Conference on IEEE, Piscataway, NJ, US, Dec. 8, 2010, pp. 147-154.
(Continued)

*Primary Examiner* — Nadeem Iqbal
(74) *Attorney, Agent, or Firm* — Russell Ng PLLC; Steven Bennett

(57) ABSTRACT

A technique for operating a group of virtual machines (VMs) includes utilizing a checkpoint procedure to maintain secondary VMs to assume tasks of primary VMs within a cluster in the event of failover. On failover of a first one of the primary VMs, a first one of the secondary VMs assumes the tasks from the checkpoint immediately preceding a failover event. Each of the primary VMs is connected to receive data from remaining ones of the primary VMs via an internal bus and process the data on receipt. Checkpoints for the primary VMs are synchronized. For each of the primary VMs, release to the external bus of data generated on the basis of received internal bus data is prevented until a subsequent checkpoint has occurred. On failover of one of the primary VMs, all of the primary VMs are directed to initiate failover to an associated one of the secondary VMs.

20 Claims, 5 Drawing Sheets

(51) Int. Cl.
*H04L 12/24* (2006.01)
*G06F 9/455* (2006.01)

(52) U.S. Cl.
CPC ...... *G06F 11/2023* (2013.01); *G06F 11/2097* (2013.01); *H04L 41/0663* (2013.01); *G06F 11/1438* (2013.01); *G06F 11/203* (2013.01); *G06F 11/2094* (2013.01); *G06F 2009/4557* (2013.01); *G06F 2201/815* (2013.01); *G06F 2201/82* (2013.01)

(58) Field of Classification Search
CPC ............. G06F 11/1407; G06F 11/2097; G06F 9/4558; G06F 9/45557
See application file for complete search history.

(56) References Cited

U.S. PATENT DOCUMENTS

| 8,539,137 | B1* | 9/2013 | Protassov et al. | 711/6 |
| 8,650,564 | B2* | 2/2014 | Huang et al. | 718/1 |
| 2009/0113109 | A1 | 4/2009 | Nelson et al. | |
| 2010/0107158 | A1* | 4/2010 | Chen et al. | 718/1 |
| 2010/0318991 | A1* | 12/2010 | Venkitachalam et al. | 718/1 |
| 2011/0167298 | A1* | 7/2011 | Lee | 714/18 |
| 2012/0096458 | A1* | 4/2012 | Huang et al. | 718/1 |
| 2013/0007506 | A1* | 1/2013 | Jain et al. | 714/4.12 |

OTHER PUBLICATIONS

Brendan Cully et al., "Remus: High Availability via Asynchronous Virtual Machine Replication," Internet Citation, Apr. 16, 2008, pp. 161-174, URL: http://www.usenix.org/events/nsdi08/tech/full_papers/cully.pdf.

International Application No. PCT/EP2011/073262, International Search Report, Feb. 17, 2012.

* cited by examiner

TECHNIQUES FOR VIRTUAL MACHINE MANAGEMENT

This application is a National Stage of International Application No. PCT/EP2011/073262 (which has a priority date of Dec. 21, 2010), entitled "METHOD FOR VIRTUAL MACHINE MANAGEMENT AND SYSTEM SUPPORTING THE SAME," filed Dec. 19, 2011, the disclosure of which is hereby incorporated herein by reference in its entirety for all purposes.

BACKGROUND

The disclosure generally relates to virtual machines and, more specifically, to techniques for virtual machine management.

In computer systems, the use of virtual machines (VMs) is increasingly common, with an individual VM being provided to handle anything from an individual program or process up to a complete operating system (OS). Individual processors may host one or more VMs, with a processor software layer (referred to as a VM monitor (VMM) or hypervisor) that supports the VMs. While it is generally beneficial for VMs to be isolated, inter-communication between VMs is required in many situations. In fault-tolerant systems (typically high-importance systems, e.g., server architectures or alarm systems) back-up provision has been made such that when a component fails a replacement can be switched in to allow operation of the systems to continue with minimal interruption. In a fault-tolerant system that includes multiple VMs, a back-up provision may include additional processing capacity (in some instances on a connected but physically separate machine) within which a replacement VM can be instantiated in the event of failure.

In general, to minimize delays, a replacement VM should be able to take over the operations of a failing VM as quickly as possible. As such, a mechanism should be provided such that a replacement VM is aware of a point in a program or process where the failure occurred so that the replacement VM can resume operation from that point. One option is to run a replacement machine in parallel with an original machine, with the replacement machine receiving the same input data as the original machine. Implementing parallel redundant machines is costly in terms of the duplication of processing power to maintain operation of the replacement machine.

U.S. Patent Application Publication No. 2008/0189468 (Schmidt) and U.S. Pat. No. 7,213,246 (van Rietschote) describe systems of multiple VMs that utilize an alternate strategy. In operation, for a given original VM, a description of the VM and current VM state data are periodically gathered and stored in order to allow for creation of a replacement VM on failure of the original VM. U.S. Patent Application Publication No. 2008/0155208 (Hiltgen) describes a similar system and addresses security issues for handling captured state data. Systems that store a description of a VM and current VM state data have a lower processing overhead than systems that run a parallel VM, but are slower to transition in the event of failure, as it is first necessary to instantiate a replacement VM before the replacement VM can take over operations for an original VM.

A VM mirror is a way of running a VM such that if a failure occurs, the failing VM can be nearly instantly restarted on a second machine. State data is continually exchanged between a primary VM and a secondary machine through a process known as checkpointing, where a state of a primary VM is periodically captured and transferred to a secondary machine in the event of a failure of the primary VM. An example of a checkpointing VM system is described in U.S. Patent Application Publication No. 2010/0107158 (Chen).

In the event of failure, a secondary VM, which is a mirror of a primary VM at a last checkpoint before failure, can take over operations from the last checkpoint before failure. As should be recognized, the shorter the interval between checkpoints, the closer a state of a secondary VM to a state of a primary VM. However, as there is a processing overhead associated with the checkpoint operation, a balance has to be struck between overhead and frequency of checkpointing. An additional issue with a checkpointing system is that in order to avoid duplication of external network traffic generated between a primary VM and its respective secondary VM, any external network data packets generated by the primary VM should be buffered until a subsequent checkpoint has passed. Unfortunately, buffering external network data packets introduces operation delays, especially when a relatively long checkpoint interval is used.

SUMMARY

A technique for operating a group of virtual machines (VMs) includes utilizing a checkpoint procedure to maintain secondary VMs to assume tasks of primary VMs in the event of failover. On failover of at least one of the primary VMs within a cluster, an associated one of the secondary VMs assumes the tasks from the checkpoint immediately preceding a failover event. Each of the primary VMs is connected to receive data from remaining ones of the primary VMs via an internal bus and process the data on receipt. Checkpoints for the primary VMs are synchronized. For each of the primary VMs, release to the external bus of data generated on the basis of received internal bus data is prevented until a subsequent checkpoint has occurred. On failover of one of the primary VMs, all of the primary VMs are directed to initiate failover to an associated one of the secondary VMs.

BRIEF DESCRIPTION OF THE DRAWINGS

The present invention is illustrated by way of example and is not intended to be limited by the accompanying figures, in which like references indicate similar elements. Elements in the figures are illustrated for simplicity and clarity and have not necessarily been drawn to scale.

DETAILED DESCRIPTION

Figure 1:
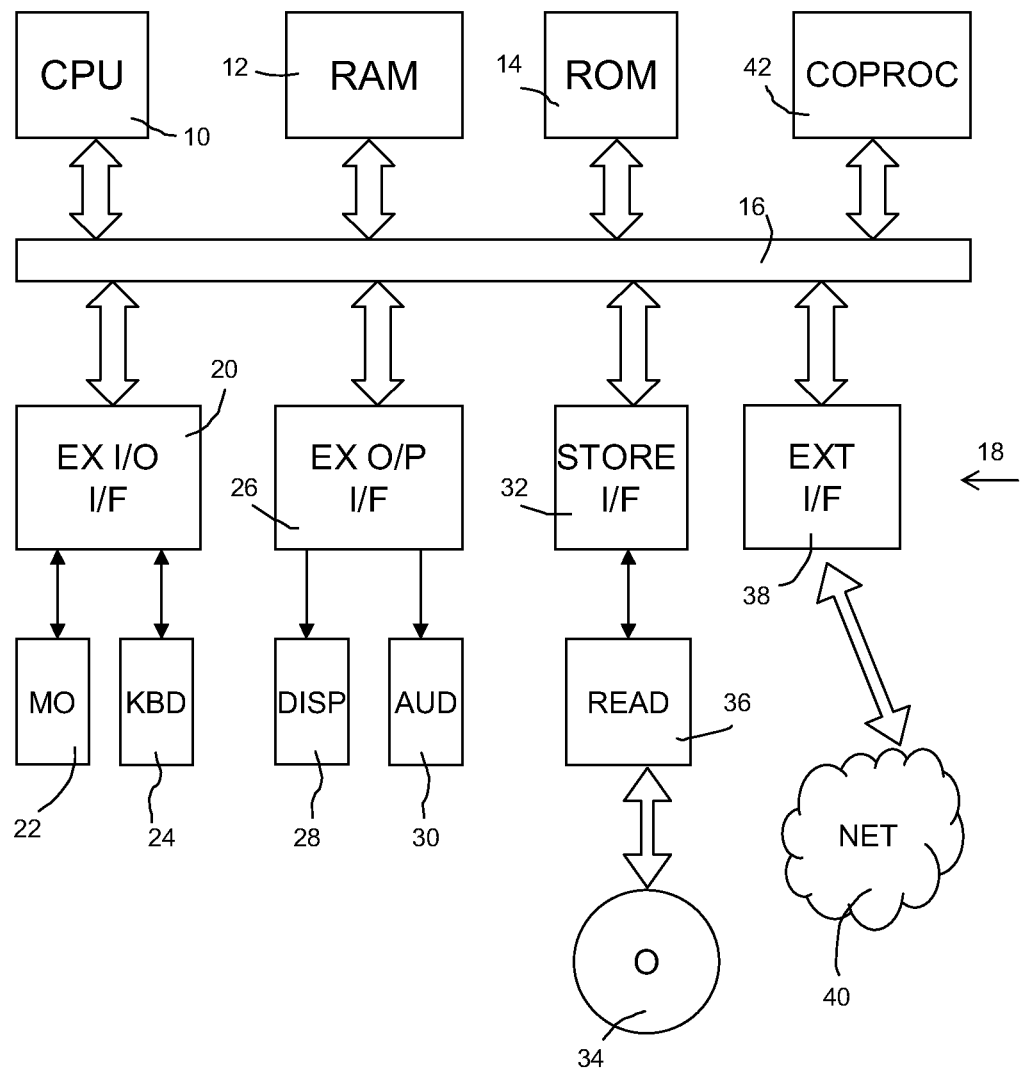
FIG. 1 is a block diagram of an exemplary data processing system.

As will be appreciated by one of ordinary skill in the art, the present invention may be embodied as a method, system, device, or computer program product. Accordingly, the present invention may take the form of an embodiment including hardware, an embodiment including software (including firmware, resident software, microcode, etc.), or an embodiment combining software and hardware aspects that may all generally be referred to herein as a circuit, module, or system. The present invention may, for example, take the form of a computer program product on a computer-usable storage medium having computer-usable program code embodied in the medium.

Any suitable computer-usable or computer-readable storage medium may be utilized. The computer-usable or computer-readable storage medium may be, for example, but is not limited to, an electronic, magnetic, optical, electromagnetic, infrared, or semiconductor system, apparatus, or device. More specific examples (a non-exhaustive list) of the computer-readable storage medium include: a portable computer diskette, a hard disk, a random access memory (RAM), a read-only memory (ROM), an erasable programmable read-only memory (EPROM) or flash memory, a portable compact disc read-only memory (CD-ROM), an optical storage device, or a magnetic storage device. As used herein, the term "coupled" includes a direct electrical connection between elements or blocks and an indirect electrical connection between elements or blocks achieved using one or more intervening elements or blocks.

In accordance with a first aspect of the present disclosure a method, for operating a cluster of virtual machines (VMs) that includes two or more primary VMs with each VM being linked to an external data bus and each primary VM being operable to generate data and transmit the data on the external bus and to receive and process data from the external bus, includes for each primary VM, utilizing a checkpoint procedure to maintain a respective secondary VM to assume tasks of the primary VM in the event of failover. The method also includes on failover, causing the secondary VM to assume the tasks of the respective primary VM from the checkpoint immediately preceding a failover event. Each primary VM of the cluster is connected to receive data via an internal bus and process the data on receipt. The method further includes: synchronizing the checkpoints for all primary VMs; for each primary VM machine, preventing release to the external bus of data (generated on the basis of received internal bus data) until a subsequent checkpoint has occurred; and on failover of one primary VM of the cluster, causing all primary VMs to initiate failover to their respective secondary VMs.

Through implementation of an internal bus, VMs can receive and process data from other VMs cluster without having to wait for a checkpoint to pass. By synchronizing the checkpoints and failing over all primary VMs together, the possibility of spurious external bus traffic being generated is avoided. In one or more embodiments, for at least one primary VM, on the occurrence of failover within the cluster, if it is determined that the at least one primary VM has not received internal bus data since the preceding checkpoint, the at least one primary VM may be prevented from failing over to its respective secondary VM when other primary VMs of the cluster failover. In other words, only those primary VMs that have received internal bus data since the previous checkpoint are failed over. The cluster may further include at least one further primary VM, with the method further comprising stopping the operation of the further primary VM when other primary VMs of the cluster failover. This enables the accommodation of primary VMs that do not have a respective secondary VM. In such an arrangement, the further primary VM of the cluster may be connected to receive data from the primary VMs via the internal bus and process the data on receipt, with the method further comprising, for the further primary VM, preventing release to the external bus of data generated on the basis of received internal bus data until a subsequent checkpoint has occurred. Following failover, the respective secondary VMs may be redesignated as primary VMs in a new cluster, and new respective secondary VMs may be designated.

According to another embodiment of the present disclosure, an apparatus is disclosed that includes a data processing system (computer system) having at least one processor coupled with one or more data storage devices. The system is configured to operate a cluster of VMs that includes two or more primary VMs, with each of the primary VMs being linked to an external data bus. Each of the primary VMs is operable to generate data and transmit the data on the external bus and to receive and process data from the external bus. For each of the primary VMs, the system maintains (via a checkpoint procedure) a respective secondary VM to assume tasks an associated one of the primary VMs in the event of failover. On detection of a failover, the system transfers the tasks of each of the primary VMs to the respective secondary VMs, with each of the secondary VMs mirroring the state of an associated one of the primary VMs at the checkpoint immediately preceding a failover event. The system synchronizes the checkpoints for all of the primary VMs and further includes an internal bus mechanism, with each primary VM of the cluster being connected to receive data from the internal bus and process the data on receipt. Utilizing the one or more storage devices, each of the primary VMs buffers external bus data generated on the basis of received internal bus data and releases the data to the external bus when a subsequent checkpoint has occurred.

In one or more embodiments, on failover of one of the primary VMs, the system directs all primary VMs of the cluster to failover to their respective secondary VMs. In an embodiment, each primary and secondary VM is suitably linked to the remainder of the system through a respective hypervisor. In one embodiment, all primary VMs of the cluster may be hosted by a single processor device and linked through a single hypervisor. Alternately, the primary VMs of the cluster may be hosted by two or more processor devices with respective hypervisors being connected for the exchange of internal bus data. For at least one primary VM of the cluster, on the occurrence of failover within the cluster, the system may determine whether the at least one primary VM has received internal bus data since the preceding checkpoint and, if not, the at least one primary VM may be prevented by the system from failing over to the respective secondary VM when other primary VMs of the cluster failover.

A cluster may further include at least one additional primary VM whose operation is stopped by the system when other primary VMs of the cluster failover. The additional primary VM of the cluster may be connected to receive data from the primary VMs via the internal bus and process the data on receipt and may be arranged to utilize the one or more storage devices to buffer external bus data generated by the additional primary VM on the basis of received internal bus data and release the data to the external bus when a subsequent checkpoint has occurred. According to another aspect, a computer program product for creating a first computer resource at a client computer includes a computer-readable storage device that is readable by a processor and stores instructions for execution by the processor for performing the above-described methods. Advantageously, the techniques disclosed herein generally improve the performance of network communication, in particular, by reducing latency for communication between VMs running on a system using checkpointing.

FIG. 1 schematically represents exemplary components of a data processing system (computer system) configured according to the present disclosure. A central processing unit (CPU) processor 10 is coupled to random access memory (RAM) 12 and read-only memory (ROM) 14 via an address and data bus 16. Also coupled to CPU 10 via bus 16 is a coprocessor device 42, which supplements the functions of CPU 10, handling processes such as floating-point arithmetic, graphics processing, signal processing, and encryption. Each of these internal hardware devices 10, 12, 14, and 42 includes a respective interface (not shown) that supports connection to bus 16. These interfaces are conventional in form and are not described in further detail herein. Also connected to CPU 10 via bus 16 are a number of external hardware device interface stages 18.

A first interface stage 20 supports the connection of external input/output devices, such as a mouse 22 and/or keyboard 24. A second interface stage 26 supports the connection of external output devices, such as a display screen 28 and/or audio output device 30, e.g., headphones or speakers. A third interface stage 32 supports connection to external data storage devices in the form of computer-readable media: such external storage may as shown be provided by a removable optical or magnetic disc 34 (accessed by a suitably configured disc reader 36). Alternatively or additionally the external storage may be in the form of a solid state memory device, e.g., an extension drive or memory stick. A fourth interface stage 38 supports connection of the system to remote devices or systems via wired or wireless networks 40, e.g., a local area network (LAN) or via the Internet.

Figure 2:
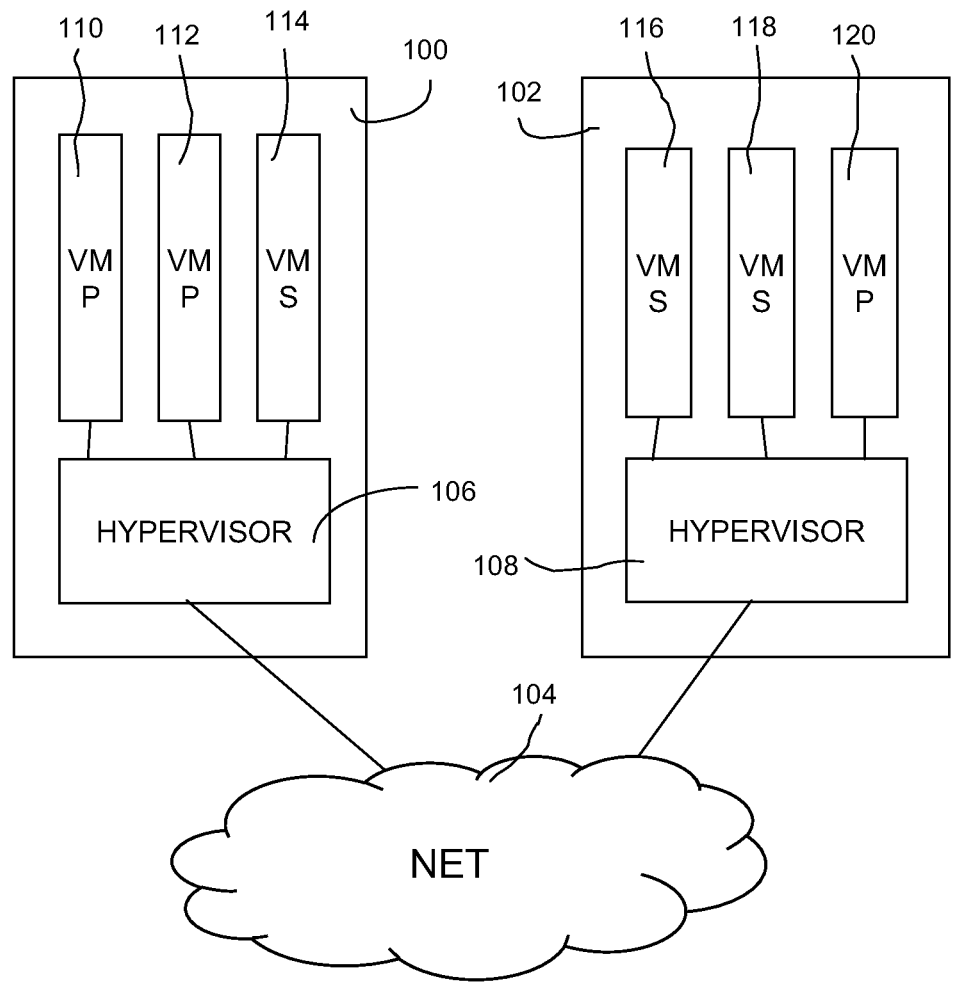
FIG. 2 is a block diagram of a linked pair of processor devices that each host a plurality of virtual machines (VMs), according to one embodiment of the present disclosure.

FIG. 2 shows a first physical machine 100 and a second physical machine 102 (i.e., processor devices) that are connected via a network 104. Machines 100 and 102 provide respective hypervisors 106 and 108. Hypervisor 106 hosts two primary VMs (VMP) 110 and 112 and a secondary VM (VMS) 114. Hypervisor 108 hosts one primary VM 116 and two secondary VMs 118 and 120. Primary VMs 110, 112, and 120 form a cluster for the exchange of data, as is discussed in further detail below, and each primary VM 110, 112, and 120 is associated with a respective one of secondary VMs 116, 118, and 114. As previously mentioned, a VM mirror is a way of running a VM such that if a failure occurs the VM can be almost instantly restarted on a second physical machine. In the example shown, if primary VM 112 fails, its operation is restarted on secondary VM 118.

According to the present disclosure, state data is periodically passed from a primary VM to a respective secondary machine. The state data is passed by checkpointing the primary VM (which comprises capturing the state of the primary machine and transferring it to the secondary machine). According to the present disclosure, techniques are employed to improve the performance of network communication and, in particular, to reduce latency for communication between primary VMs running on a same or separate physical machines.

Figure 3:
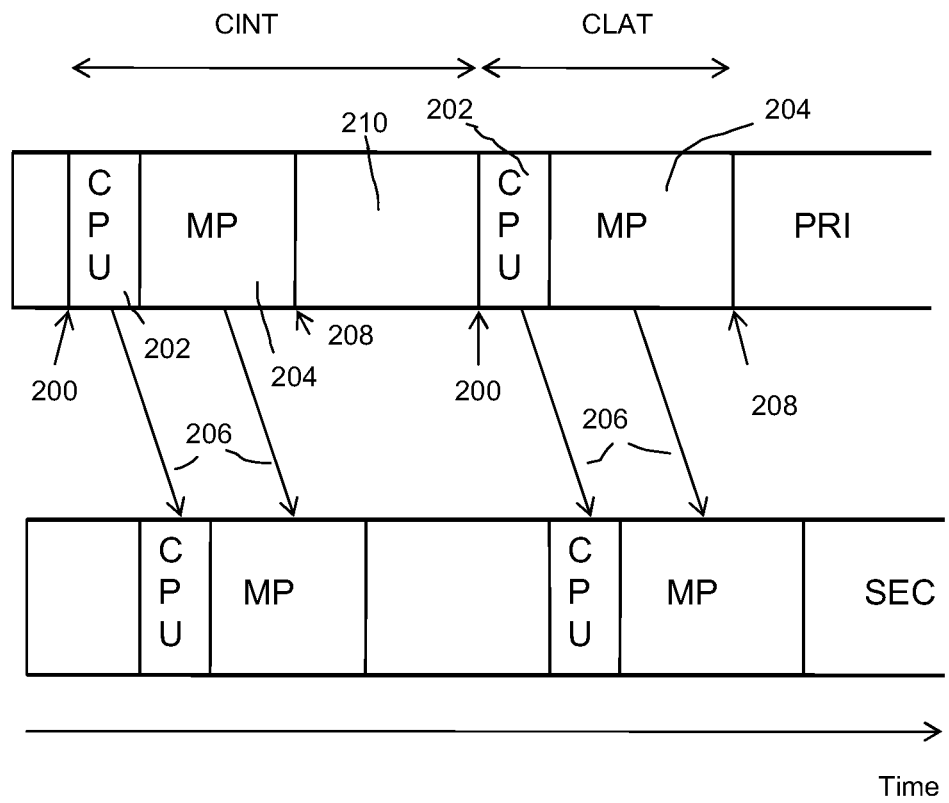
FIG. 3 is a diagram of an exemplary data transfer during a checkpointing process, according to one embodiment of the present disclosure.

FIG. 3 illustrates the transfer of data between primary (PRI) and secondary (SEC) VMs in a checkpointing process. When a checkpoint occurs, a number of operations take place. First, all threads of a primary VM PRI are paused 200. Next, a CPU state of each of the threads is captured 202. Then, memory pages that have been changed since the previous checkpoint are captured 204. Next, the memory changes and CPU state are transferred to a secondary VM SEC 206. The primary VM is then resumed 208. As should be understood by those of ordinary skill in the art, some of these operations can occur in parallel or in a semantically equivalent order. For example, the primary VM PRI may be resumed before the transfer to the secondary VM SEC occurs.

The slight time offset for the secondary VM is due to the time taken to transfer at 206. With a fast data connection between the primary and secondary VMs, the offset may be considered negligible. For the sake of clarity, the offset is omitted. Two set intervals in the process are a checkpoint interval CINT and the checkpoint latency CLAT. The checkpoint interval CINT is preferably of a fixed duration that is a trade-off between restart delay and processor overhead. The checkpoint latency CLAT is the time taken to capture and send CPU 202 and memory 204 states for the primary VM to the secondary VM.

Failover is the process of the secondary VM taking over the work that the mirrored primary VM was doing. Failover occurs when the primary VM or hardware on which the primary VM is executing fails. When failover occurs, the secondary VM begins from the previous checkpoint and any work (e.g., CPU cycles, changes to memory) that the primary VM had done since the previous checkpoint is lost. As stated above, when failover occurs the secondary VM resumes at the previous checkpoint. This means that the outside environment must reflect the state corresponding to that checkpoint. For network packets, the network packets cannot be released (seen by the outside world) until after the checkpoint has been received by the secondary VM.

Figure 4:
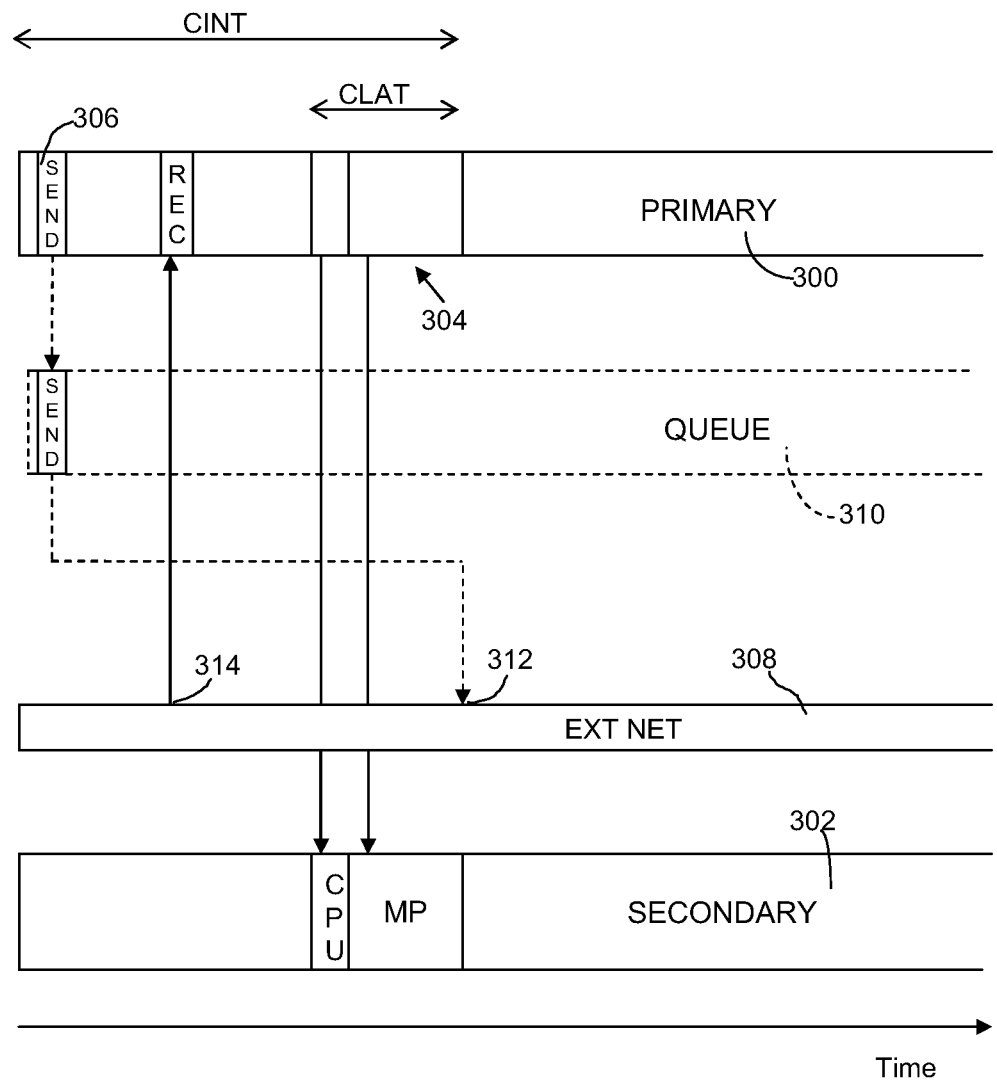
FIG. 4 is a diagram that illustrates a deferred output of external network data associated with a checkpointing process, according to an embodiment of the present disclosure.

As illustrated in FIG. 4, a primary VM 300 and secondary VM 302 perform a checkpoint operation, indicated generally at point 304. At point 306 the primary VM generates a data packet for transmission via external bus or network 308. As the packet cannot be released immediately, it is placed in a queue 310 until a following checkpoint has been completed, at which point 312 the queued packet is released to the external network 308. In contrast, an incoming packet destined for the primary VM and received on external network 308 at point 314 is passed directly to the VM without delay. Controlling interactions with the outside environment is part of any VM mirroring solution and is a component in determining the performance of any such solution. Delaying (increasing latency) of network operations can cause serious performance degradation so any solution that can minimize such degradation is desirable.

According to the present disclosure, network packets from a mirrored VM are seen by other VMs without having to wait for a checkpoint to occur. In order to achieve this, a mechanism is put in place that ensures that all the other VMs that can "see" the network traffic: cannot effect the outside environment until the checkpoint has been completed; and must be able to return to the state before the network traffic was seen if a failure of the sender occurs. An environment in which all the VMs are mirrored is configured to meet these goals by: synchronizing checkpoints between all of the VMs; and assuring all primary VMs failover to their respective secondary VM if any one of them fails. This approach may be described as mutually assured network destruction because if any one VM fails, all of them must be destroyed (and recreated) in order to continue running.

Figure 5:
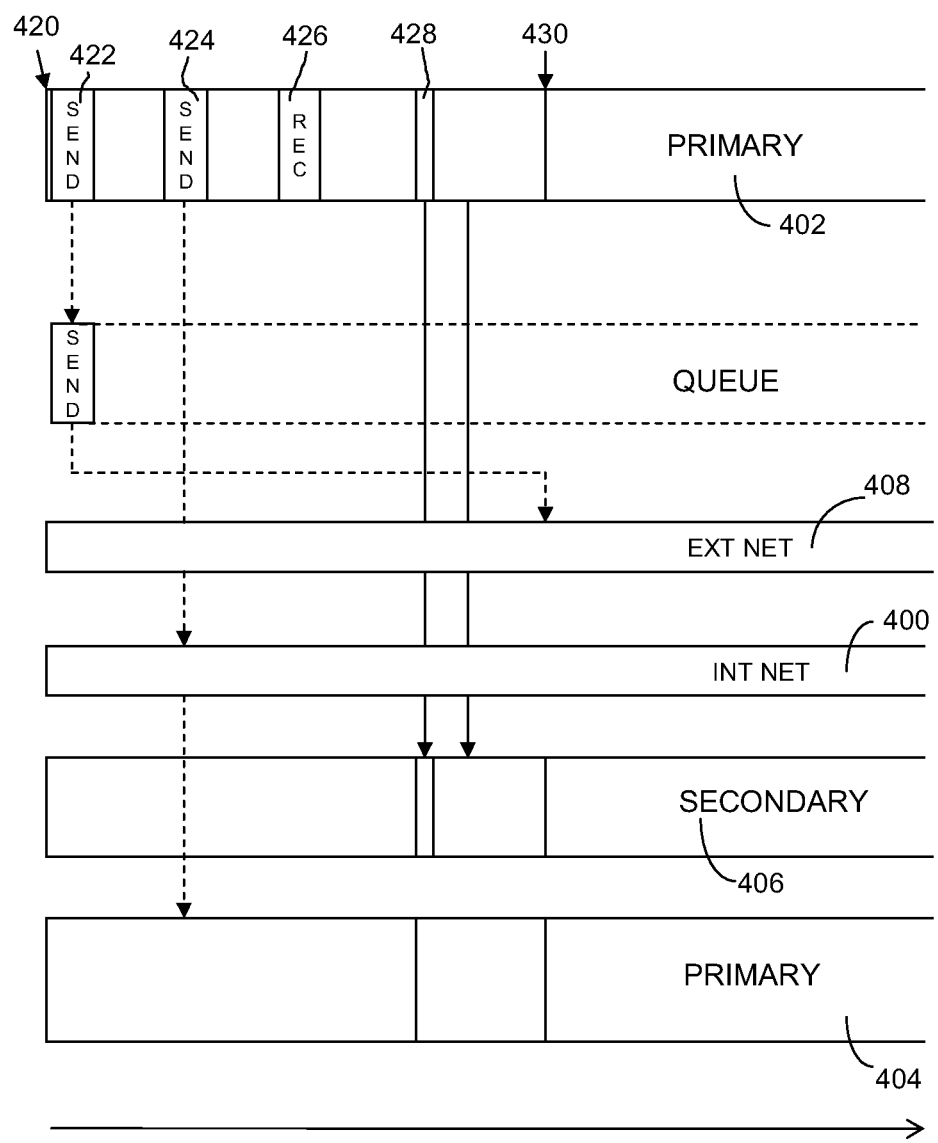
FIG. 5 is a diagram that shows the provisioning of an internal network and transfer of data prior to expiration of a checkpoint interval, according to another embodiment of the present disclosure.

FIG. 5 shows some network events that can occur between checkpoints. In general, the techniques disclosed herein reduce network traffic latency while ensuring that should a failure occur, network traffic that should not have been seen can have no external effect. Internal network 400 is the network between mirrored VMs 402 and 404, which are linked in a mutually assured network destruction pool or cluster. Execution begins at point 420, with time increasing towards the right. Secondary VM 406 is already in existence and the following points indicate a subset of events that may occur during a checkpoint interval. At point 422, primary VM 402 requests a network packet be sent to a machine on the external network 408. The packet is stored in a queue 410 and may be sent at a later time (following the next checkpoint interval). At point 424, primary VM 402 requests a network packet be sent to a primary VM 404 on internal network 400. The network from VM 402 is sent directly to VM 404.

At point 426, a packet is received by external network 408 and is immediately sent to primary VM 402. In general, no special treatment is generally required for packets received by external network 408 as networks such as Ethernet are inherently lossy and if the VM fails the packet may be resent. The determination as to whether or not to resend a packet is typically up to an associated executing application running, e.g., in a streaming audio broadcast lost packets are generally not resent. At point 428, a checkpoint is reached, and primary VM 402 is momentarily "paused". The CPU state and any memory pages that have been modified since the previous checkpoint are captured and transfer of the CPU state and modified pages to secondary VM 406 is initiated. At point 430, transfer of CPU state and modified pages completes. At point 430 the modified pages and CPU state are applied to secondary VM 402 and queued network traffic for external network 408 can be released.

The above steps are repeated for every checkpoint as long as all the primary VMs in the cluster are running correctly. However, if any of the primary VMs fail, all of those primary VMs must failover to their corresponding secondary VM. A mutually assured destruction pool is a cluster of VMs that are able to communicate network packets without delay (via internal network 400). As stated above, VMs achieve this by synchronizing checkpoints and ensuring that if any one VM fails, then all primary VMs in a cluster failover to their respective secondary VMs. In order to synchronize checkpoints, hypervisors controlling each of the VMs must communicate. The easiest way to synchronize checkpoints is to only have one hypervisor and run all the VMs on the same physical machine. Alternatively, a low-latency communication link may be implemented between physical machines to allow multiple hypervisors to readily synchronize checkpoints. In such a configuration, the internal and external networks may share the same physical connections but network traffic on the internal network must also be isolated from the outside world (i.e. the external network).

In general, secondary VMs have no limit on placement. That is, secondary VMs can be situated on different physical machines and do not require any special network connection. However, the mutually assured destruction pool cannot continue to operate after primary VMs have failed over to secondary VMs since the secondary VMs are redesignated as primary VMs and new respective secondary VMs are defined. In a modification to the above system, the mutually assured network destruction is partial rather than total. That is, if one of the primary VMs fails, only the other VMs in the pool that have seen traffic from the failed primary VM need to also failover. As such, if a system is built such that the system knows which VMs have received network traffic from a failing primary VM since the last checkpoint, only the VMs that have received network traffic from the failed primary VM need to also failover. In the event that no network traffic has been sent since the last checkpoint, only the failing primary VM must failover. In a further modification, while it was stated previously that all machines in the mutually assured destruction pool should be mirrored, this need not always be the case. While this is likely to be the configuration that is most useful, there is another configuration that is valid. Not all the VMs have to be mirrored. However, all VMs should have all externally visible transactions delayed until after the checkpoints on those machine that are mirrored have completed. If a failure occurs in this situation, the mirrored machines should failover (as above), and the non-mirrored machines should be stopped.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," (and similar terms, such as includes, including, has, having, etc.) are open-ended when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to preferred embodiments thereof, it will be apparent that modifications and variations are possible without departing from the scope of the invention defined in the appended claims.

What is claimed is:

1. A method of operating a group of virtual machines (VMs) that includes two or more primary VMs and two or more secondary VMs with the primary VMs within a cluster being linked to an external bus and with each of the primary VMs being operable to generate data and transmit the data on the external bus and to receive and process data from the external bus, the method comprising:
   for each of the primary VMs, utilizing a checkpoint procedure to maintain an associated one of the secondary VMs to assume tasks of the associated one of the primary VMs in the event of failover; and
   on failover of one of the primary VMs, causing the associated one of the secondary VMs to assume the tasks of the associated one of the primary VMs from the checkpoint immediately preceding a failover event, wherein each of the primary VMs is connected to receive data from remaining ones of the primary VMs via an internal bus and process the data received on the internal bus on receipt;
   synchronizing the checkpoints for the primary VMs;
   for each of the primary VMs, preventing release to the external bus of data generated on the basis of received internal bus data until a subsequent checkpoint has occurred; and
   on failover of one of the primary VMs, causing all of the primary VMs to initiate failover to an associated one of the secondary VMs.

2. The method of claim 1, wherein for at least one of the primary VMs, on the occurrence of failover within the cluster, determining whether the at least one of the primary VMs has received internal bus data since the preceding checkpoint and, if not, preventing the at least one of the primary VMs from failing over to its respective secondary VM when other of the primary VMs failover.

3. The method of claim 1, wherein the cluster further includes at least one additional primary VM that does not have an associated secondary VM and operation of the at least one additional primary VM is stopped when the primary VMs failover.

4. The method of claim 3, wherein the additional primary VM is connected to receive data from the primary VMs via the internal bus and process the data on receipt, and wherein release to the external bus of data generated on the basis of received internal bus data for the additional primary VM is prevented until a subsequent checkpoint occurs.

5. The method of claim 1, further comprising:
   redesignating the secondary VMs as new primary VMs of a new cluster following failover; and
   designating new associated secondary VMs for the new primary VMs.

6. An apparatus, comprising:
   one or more data storage devices; and
   at least one processor coupled to the one or more data storage devices, wherein the apparatus is configured to operate a group of virtual machines (VMs) that include two or more primary VMs and two or more secondary VMs with the primary VMs within a cluster being linked to an external data bus, and wherein:
   each of the primary VMs is operable to generate data and transmit the data on the external bus and to receive and process data from the external bus;
   for each of the primary VMs, the apparatus maintains, via a checkpoint procedure, associated ones of the secondary VMs to assume tasks of the primary VMs in the event of failover;
   on detection of a failover, the apparatus initiates transfer of the tasks of the primary VMs to associated ones of the secondary VMs, with each of the secondary VMs mirroring the state of one of the primary VMs at the checkpoint immediately preceding a failover event;
   the apparatus synchronizes the checkpoints for the primary VMs;
   the apparatus implements an internal bus mechanism, with each of the primary VMs being connected to receive data from remaining ones of the primary VMs via the internal bus and process the data on receipt;
   the one or more storage devices are utilized to buffer, for the primary VMs, external bus data generated on the basis of received internal bus data and release the data to the external bus when a subsequent checkpoint occurs; and
   on failover of one of the primary VMs, all of the primary VMs are directed to initiate failover to their respective secondary VMs.

7. The apparatus of claim 6, wherein the primary and secondary VMs are linked via a hypervisor.

8. The apparatus of claim 6, wherein the primary VMs are hosted by a single processor and linked via a single hypervisor.

9. The apparatus of claim 6, wherein the primary VMs are hosted by two or more processor devices and respective hypervisors are connected for the exchange of internal bus data.

10. The apparatus of claim 6, wherein for at least one of the primary VMs, on the occurrence of failover within the cluster, the apparatus determines whether the at least one of the primary VMs has received internal bus data since the preceding checkpoint and, if not, the at least one of the primary VMs is prevented by the apparatus from failing over to an associated one of the secondary VMs when remaining ones of the primary VMs failover.

11. The apparatus of claim 6, wherein the cluster includes at least one additional primary VM whose operation is stopped when other ones of the primary VMs failover.

12. The apparatus of claim 11, wherein the additional primary VM is connected to receive data from the primary VMs via the internal bus and process the data on receipt, and wherein the additional primary VM utilizes the one or more storage devices to buffer external bus data generated on the basis of received internal bus data and release the buffered external bus data to the external bus when a subsequent checkpoint occurs.

13. The apparatus of claim 6, wherein the apparatus is a data processing system.

14. A computer program product, comprising:
   a computer-readable storage device; and
   code stored on the computer-readable storage device, wherein the code, when executed by a data processing system, causes the data processing system to:
   operate a group of virtual machines (VMs) that includes two or more primary VMs and two or more secondary VMs, wherein each of the primary VMs within a cluster is linked to an external data bus and each of the primary VMs is configured to generate data and transmit the data on the external bus and to receive and process data from the external bus;
   maintain, for each of the primary VMs, via a checkpoint procedure an associated one of the secondary VMs to assume tasks of the primary VMs in the event of failover;
   on detection of a failover of at least one of the primary VMs, transfer tasks of the at least one of the primary VMs to an associated one of the secondary VMs, where each of the secondary VMs mirrors the state of one of the primary VMs at the checkpoint immediately preceding a failover event;

synchronize the checkpoints for all of the primary VMs;

connect each one of the primary VMs to receive data from remaining ones of the primary VMs via an internal bus and process the data on receipt;

buffer for each of the primary VMs external bus data generated on the basis of received internal bus data and release the external bus data to the external bus when a subsequent checkpoint has occurred; and on failover of one of the primary VMs, direct all of the primary VMs to initiate failover to an associated one of the secondary VMs.

15. The computer program product of claim 14, wherein the primary and secondary VMs are linked via a respective hypervisor.

16. The computer program product of claim 14, wherein the primary VMs are hosted by a single processor and linked via a single hypervisor.

17. The computer program product of claim 14, wherein the primary VMs are hosted by two or more processors and respective hypervisors are connected for the exchange of internal bus data.

18. The computer program product of claim 14, wherein for at least one of the primary VMs, on the occurrence of failover within the cluster, the code causes the data processing system to determine whether the at least one of the primary VMs received internal bus data since the preceding checkpoint and, if not, the at least one of the primary VMs is prevented from failing over to an associated one of the secondary VMs when other of the primary VMs failover.

19. The computer program product of claim 14, wherein the cluster includes an additional primary VM the operation of which is stopped when other of the primary VMs failover.

20. The computer program product of claim 19, wherein the additional primary VM is connected to receive data from the primary VMs via the internal bus and process the data on receipt, buffer external bus data generated on the basis of received internal bus data for the additional primary VM, and release the external bus data to the external bus when a subsequent checkpoint occurs.

* * * * *